(12) United States Patent
Wang et al.

(10) Patent No.: US 8,773,956 B1
(45) Date of Patent: Jul. 8, 2014

(54) BI-LAYER NFT-CORE SPACER FOR EAMR SYSTEM AND METHOD OF MAKING THE SAME

(75) Inventors: Zhongyan Wang, San Ramon, CA (US); Hongxing Yuan, San Ramon, CA (US); Shawn M. Tanner, San Jose, CA (US); Yufeng Hu, Fremont, CA (US)

(73) Assignee: Western Digital (Fremont), LLC, Fremont ( * ) Notice: Subject to any disclaimer, the term of this patent is extended or adjusted under 35 U.S.C. 154(b) by 50 days.

(21) Appl. No.: 13/312,925

(22) Filed: Dec. 6, 2011

(51) Int. Cl.
*G11B 11/00* (2006.01)

(52) U.S. Cl.
USPC .................................................. 369/13.01

(58) Field of Classification Search
None
See application file for complete search history.

(56) References Cited

U.S. PATENT DOCUMENTS

| | | | |
|---|---|---|---|
| 8,491,801 B1 * | 7/2013 | Tanner et al. | 216/22 |
| 2010/0046083 A1 | 2/2010 | Peng | |
| 2010/0123965 A1 * | 5/2010 | Lee et al. | 360/59 |
| 2010/0142079 A1 * | 6/2010 | Tanaka et al. | 360/59 |
| 2010/0165822 A1 | 7/2010 | Balamane et al. | |
| 2010/0290323 A1 * | 11/2010 | Isogai et al. | 369/13.24 |
| 2010/0329085 A1 * | 12/2010 | Kawamori et al. | 369/13.24 |
| 2011/0017981 A1 | 1/2011 | Bradley et al. | |
| 2011/0132868 A1 * | 6/2011 | Hori | 216/22 |
| 2011/0141862 A1 * | 6/2011 | Arai et al. | 369/13.33 |
| 2011/0216634 A1 * | 9/2011 | Chou et al. | 369/13.24 |
| 2011/0286127 A1 * | 11/2011 | Gao et al. | 360/59 |
| 2011/0294398 A1 * | 12/2011 | Hu et al. | 451/5 |
| 2012/0026846 A1 * | 2/2012 | Komura et al. | 369/13.33 |
| 2012/0045662 A1 * | 2/2012 | Zou et al. | 428/810 |
| 2012/0113769 A1 * | 5/2012 | Hirata et al. | 369/13.32 |
| 2012/0113770 A1 * | 5/2012 | Stipe | 369/13.33 |
| 2012/0298621 A1 * | 11/2012 | Gao | 216/22 |
| 2013/0064502 A1 * | 3/2013 | Peng et al. | 385/31 |

* cited by examiner

*Primary Examiner* — Adam R Giesy
*Assistant Examiner* — Henok Heyi

(57) ABSTRACT

Embodiments of the present invention are directed toward a bi-layer spacer structure and related fabrication processes for improving an interface between a near-field transducer (NFT) and a spacer on an optical waveguide core for an energy assisted magnetic recording (EAMR) system. The embodiments provide a solution for improving the adhesion between the NFT and the spacer.

35 Claims, 10 Drawing Sheets

Side View

Top View

Side View

Top View

Side View

Top View

Side View

Top View

Side View

Top View

BI-LAYER NFT-CORE SPACER FOR EAMR SYSTEM AND METHOD OF MAKING THE SAME

FIELD

The present invention relates generally to an energy-assisted magnetic recording (EAMR) system, and more specifically, to a spacer located at the interface between a near-field transducer (NFT) and an optical waveguide core of the EAMR system, and a method of making the same.

BACKGROUND

In an energy-assisted magnetic recording (EAMR) system, local heating is utilized to heat up a recording medium such that the coercivity of the recording medium can be reduced. With the coercivity of the heated location of the recording medium being temporarily reduced, an applied magnetic writing field can more easily direct the magnetization of the recording medium. In the EAMR system, magnetic recording heads (including writer and reader) and a light delivery system are operatively integrated together. The recording density is mainly controlled by the minimum thermal spot size in the recording medium that is produced by an optical near field transducer (NFT) at the excitation state (e.g., surface plasmon-resonance). The NFT is designed to reach a local surface plasmon (LSP) condition at a designated light wavelength.

In the related art, a typical EAMR head design includes a writer pole and a chimney (i.e., a heat sink) connecting the writer pole and an NFT located adjacent to an end of an optical waveguide core. The NFT is typically made of gold (Au) or an alloy of Au, and the NFT may have a disc shaped body (or other suitable shapes) and a pin (or peg) having one end connected with the disc shaped body and another end that is exposed at an air bearing surface (ABS) of the EAMR. A spacer is placed between the NFT and the waveguide core, and the spacer may be made of $SiO_2$ or $Al_2O_3$. However, there are advantages for choosing $SiO_2$ instead of $Al_2O_3$ as the material for the spacer and/or cladding materials. For example, $Al_2O_3$ has known erosion/corrosion problems and lower NFT media absorption efficiency than $SiO_2$. However, when the NFT is made of gold or an alloy of gold, there are known adhesion issues at the interface between Au (or an alloy of Au) and $SiO_2$. Therefore, it is desirable to provide a system for addressing the above described adhesion problem.

SUMMARY

Aspects of the present invention relate to a bi-layer spacer for improving the adhesion at
the interface between a near-field transducer (NFT) and a spacer on an optical waveguide core, and a method of making the same.

According to an embodiment of the present invention, an energy assisted magnetic recording (EAMR) apparatus includes an optical waveguide core, a near-field transducer (NFT), and a bi-layer spacer. The optical waveguide core is configured to direct light to a first end thereof. The NFT is positioned adjacent to the first end of the optical waveguide core. The bi-layer spacer is positioned between the NFT and the optical waveguide core, and the bi-layer spacer includes a first spacer layer and an oxide cap layer.

The first spacer layer may include $SiO_2$. The NFT may include a material selected from the group consisting of gold (Au) and an alloy of Au. The oxide cap layer of the bi-layer spacer may include a material selected from the group consisting of $Ta_2O_5$, $TiO_2$, and combinations thereof. The oxide cap layer of the bi-layer spacer may be positioned closer to the NFT than to the optical waveguide core. For example, the oxide cap layer of the bi-layer spacer may be in contact with the NFT, and the first spacer layer of the bi-layer spacer may be in contact with the optical waveguide core. The oxide cap layer of the bi-layer spacer may be in contact with a side of the NFT, and the oxide cap layer may have a shape substantially the same as that of the side of the NFT.

The EAMR apparatus may further include a writer pole on the NFT and a heat dissipator between the writer pole and the NFT. The EAMR apparatus may further include a first cladding layer on at least a portion of the bi-layer spacer. The EAMR apparatus may further include a second cladding layer, wherein the optical waveguide core is between the second cladding layer and the bi-layer spacer.

The oxide cap layer of the bi-layer spacer may have a thickness between about 1 nm and about 5 nm, inclusive. For example, the oxide cap layer of the bi-layer spacer may have a thickness of about 2 nm. The NFT may have a thickness between about 30 nm and about 80 nm, inclusive. The first spacer layer of the bi-layer spacer may have a thickness between about 8 nm and about 12 nm, inclusive. For example, the first spacer layer of the bi-layer spacer may have a thickness of about 10 nm.

According to an embodiment of the present invention, a method of manufacturing an EAMR apparatus is provided. The method includes forming a first cladding layer, forming an optical waveguide layer on the first cladding layer, forming a first spacer layer on the optical waveguide layer, forming an oxide cap layer on the first spacer layer, and forming a near-field transducer layer on the oxide cap layer. The oxide cap layer and the first spacer layer form a bi-layer spacer layer.

The forming the near-field transducer layer may include patterning the near-field transducer layer to form a near-field transducer (NFT) that is positioned adjacent to an end of the optical waveguide layer. The forming the oxide cap layer may include patterning the oxide cap layer such that the oxide cap layer has a shape substantially the same as that of the NFT.

The method may further include forming a second cladding layer on both the bi-layer spacer layer and the NFT, and shaping a portion of the second cladding layer to form a sloped portion on the NFT. The method may further include forming a writer pole on both the second cladding layer and the NFT. The method may further include forming a hard mask layer on the near-field transducer layer, patterning the hard mask layer to expose a portion of the near-field transducer layer, removing the exposed portion of the near-field transducer layer to form the NFT, and removing an exposed portion of the oxide cap layer of the bi-layer spacer layer such that the remaining portion of the oxide cap layer is between the NFT and the first spacer layer of the bi-layer spacer layer.

The NFT may have a pin portion having a first end and a second end that is adjacent to an end of the optical waveguide layer, and a disc portion attached to the first end of the pin portion.

DETAILED DESCRIPTION

Exemplary embodiments of the present invention are directed toward a bi-layer spacer structure and related fabrication processes for controlling the spacing between a near-field transducer (NFT) and an optical waveguide core in an energy assisted magnetic recording (EAMR) system. The exemplary embodiments address the widely known adhesion issue in the interface between Au (NFT) and $SiO_2$ (spacer material) in current $SiO_2$ cladding designs with no apparent negative optical impacts. In addition, the exemplary embodiments are compatible with current NFT hard mask processes with suitable modification.

Figure 1:
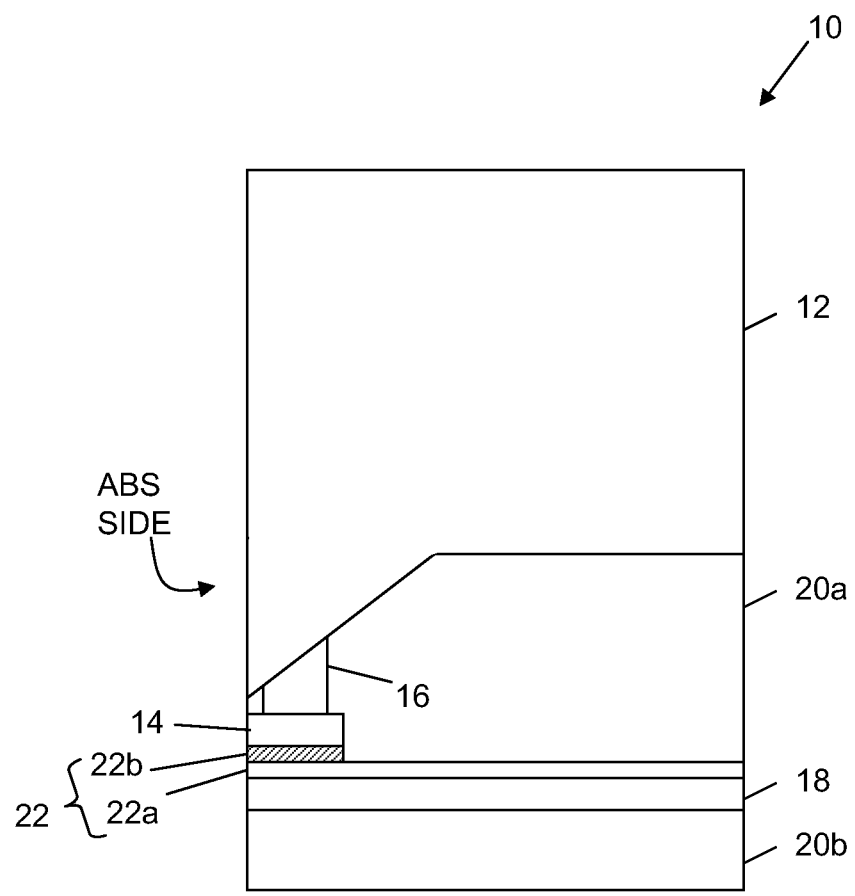
FIG. 1 is a side cross-sectional view of an EAMR head including a bi-layer NFT-core spacer according to an embodiment of the present invention.
Figure 2:
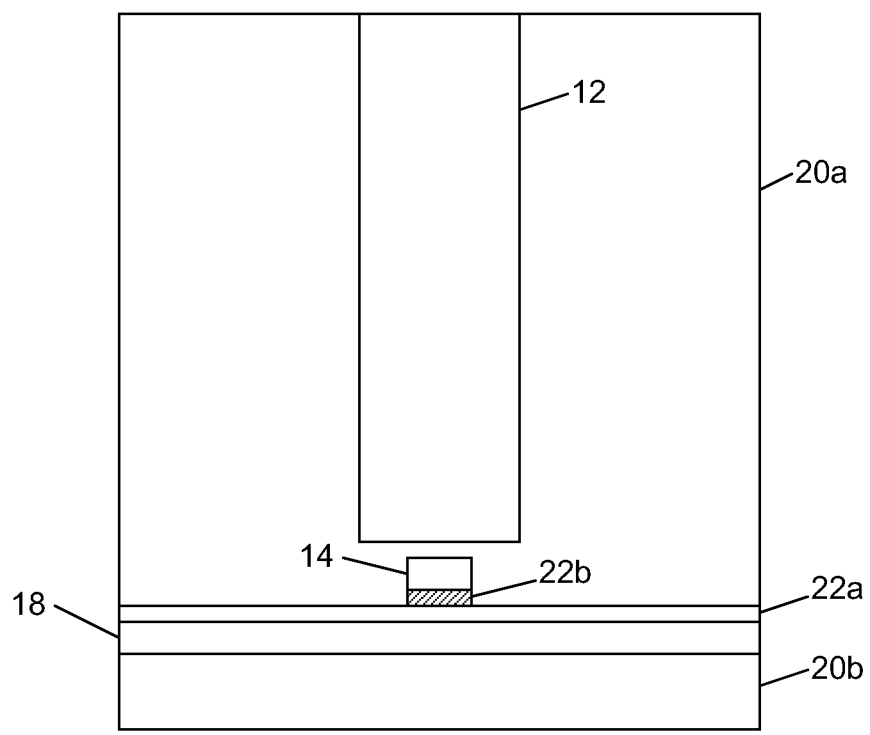
FIG. 2 is an ABS view of the EAMR recording head of FIG. 1 according to an embodiment of the present invention.

FIG. 1 a side cross-sectional view of an EAMR head 10 including a bi-layer NFT-core spacer according to an embodiment of the present invention. FIG. 2 is an ABS view of the EAMR recording head 10 according to an embodiment of the present invention. It should be understood that some parts of the EAMR head 10 that are not necessary for illustrating the inventive concept of the present invention may be omitted for clarity. Referring now to FIGS. 1 and 2, the EAMR head 10 includes a writer pole 12, an NFT 14, and a chimney (or heat sink) 16 (not visible in FIG. 2) connecting the writer pole 12 and the NFT 14. The NFT 14 may be made of gold (Au) or an alloy of Au, and have a thickness between about 30 nm and about 80 nm, inclusive. The writer pole 12, the NFT 14, and the chimney 16 are positioned on an optical waveguide core 18 and adjacent to an upper cladding layer 20a. The optical waveguide core 18 is positioned between the upper cladding layer 20a and a lower cladding layer 20b. As can be seen in FIG. 1, the NFT 14 is positioned adjacent to one end of the waveguide core 18. A bi-layer spacer layer 22 is formed between the NFT 14 and the waveguide core 18.

The upper and lower cladding layers 20a and 20b may be formed of $SiO_2$ or other suitable materials, and a portion of the upper cladding 20a has a sloped portion. The optical waveguide core 18 may be formed of $Ta_2O_5$ or other suitable materials. It should be understood that the present invention is not limited to the above discussed materials as described in the exemplary embodiment. To the contrary, other suitable materials may be used to replace one or more of the above described materials.

As discussed above, there is a known adhesion problem when the NFT 14 (e.g., made of Au or an alloy of Au) is directly interfaced with a SiO2 spacer layer. To solve this problem, according to the embodiments of the present invention, the bi-layer spacer layer 22 includes a first spacer layer 22a (e.g., a $SiO_2$ layer) and a cap layer 22b on the first spacer layer 22a. The cap layer 22b may be made of Cr, Ta, Ti, or other suitable materials. In particular, Ta may be a good option for the cap layer 22b in order to avoid corrosion or erosion problems. In one embodiment, the cap layer 22b is a thin oxide layer of $Ta_2O_5$ or $TiO_2$. The first spacer layer 22a may have a suitable thickness between about 8 nm and about 12 nm, inclusive. In one embodiment, the first spacer layer 22a has a thickness of about 10 nm. The cap layer 22b may have a suitable thickness between about 1 nm and about 5 nm. In one embodiment, the cap layer 22b has a thickness of about 2 nm. It should be understood that the dimensions and shapes of the various layers and features shown in FIGS. 1 and 2 are exaggerated for clarity, and are not representative of the actual physical dimensions.

Figure 3:
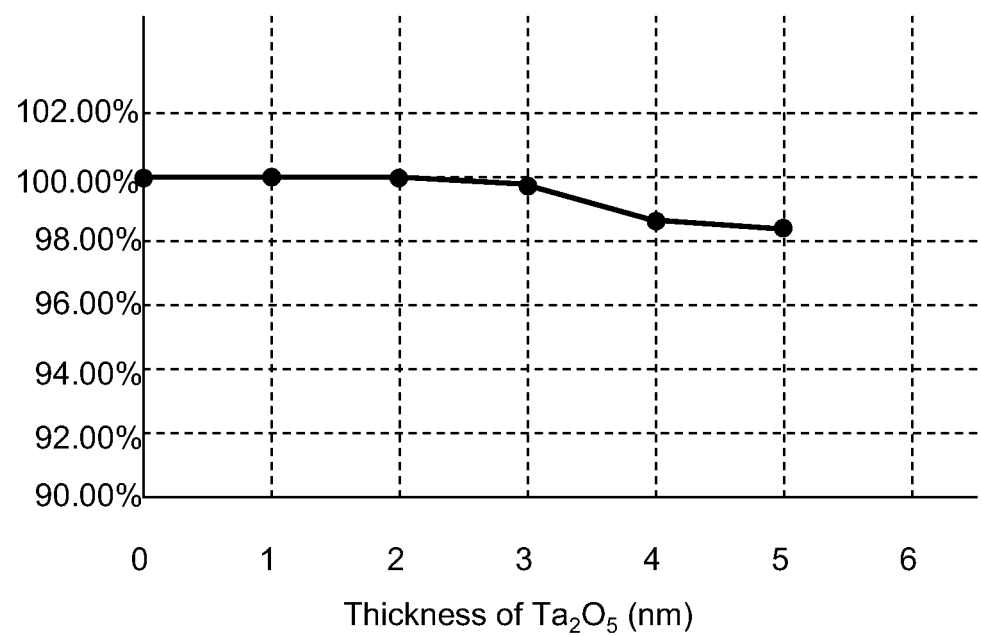
FIG. 3 is a graph illustrating simulated normalized NFT media absorption efficiency using a $Ta_2O_5$ oxide layer as a cap layer of a bi-layer spacer at various thicknesses according to an embodiment of the present invention.

FIG. 3 is a graph illustrating simulated normalized NFT media absorption efficiency using a thin $Ta_2O_5$ oxide layer as the cap layer 22a at various thicknesses according to an embodiment of the present invention. The vertical axis of the graph in FIG. 3 represents the normalized media absorption efficiency while the horizontal axis represents cap layer thickness in nanometers. In FIG. 3, it can be seen that there is no obvious drop of NFT media absorption efficiency when the thickness of the cap layer 22b is less than 3 nm. As shown in FIG. 3, even when the thickness of the cap layer 22b is 5 nm, the drop of the normalized media absorption efficiency is less than 2%.

Figure 4:
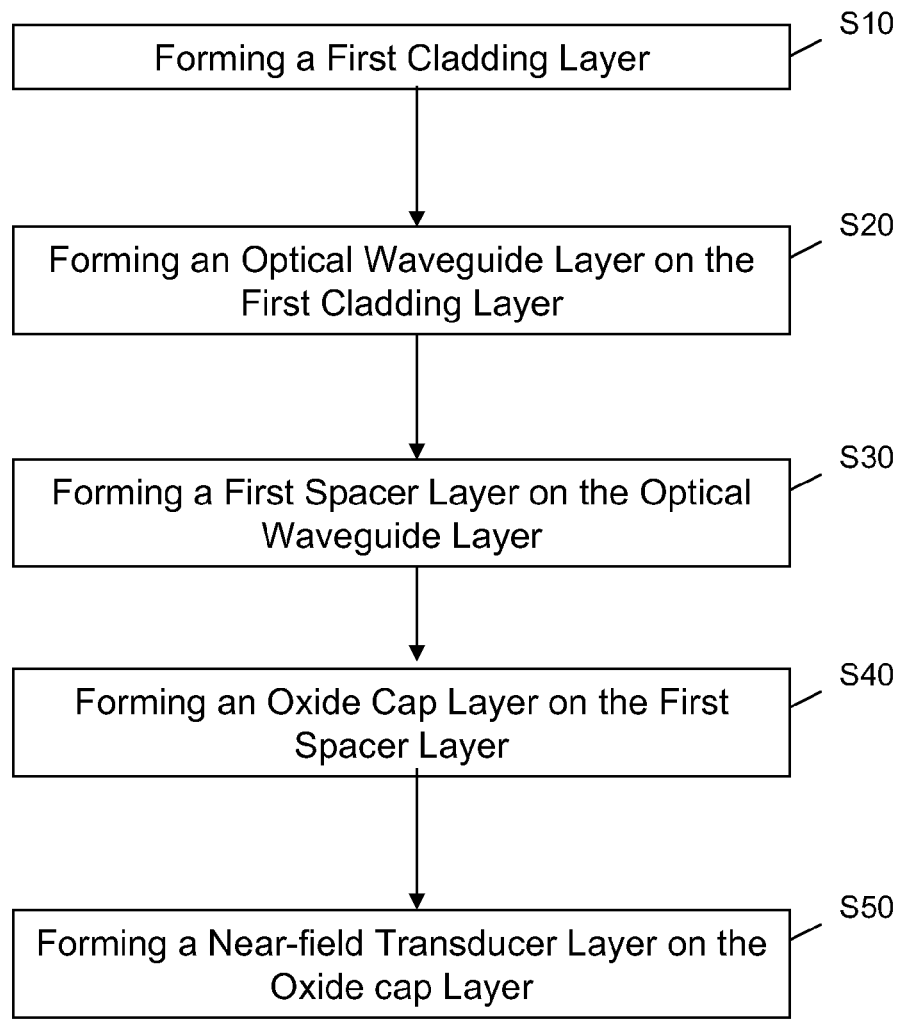
FIG. 4 is a block diagram illustrating a method of forming an EAMR apparatus having a bi-layer spacer according to an embodiment of the present invention.

FIG. 4 is a block diagram illustrating a method of forming an NFT of an EAMR apparatus having a bi-layer spacer according to an embodiment of the present invention. In particular embodiments, the method can be used to form the EAMR head of FIGS. 1 and 2 including the bi-layer spacer. Referring to FIG. 4, a multi-layered stack for fabricating the EAMR 10 is provided according to an embodiment of the present invention. In S10, a first cladding layer is formed as a base, and, in S20, an optical waveguide layer is formed on the first cladding layer. The first cladding layer and the optical waveguide layer may be formed with any suitable materials. In S30, a first spacer layer is formed on the optical waveguide layer, and, in S40, an oxide cap layer is formed on the first spacer layer. The oxide cap layer and the first spacer layer together form a bi-layer spacer layer. Subsequently, an near-field transducer layer is formed on the oxide cap layer.

FIGS. 5A-5F illustrate a photolithography process for fabricating an EAMR apparatus having a bi-layer spacer according to an embodiment of the present invention. It should be understood that FIGS. 5A-5F may not show all of the layers of the EAMR apparatus because some layers are not necessary for explaining the present invention and may therefore be omitted for clarity. Further, the dimensions and shapes of the various layers are exaggerated for clarity.

Figure 5A:
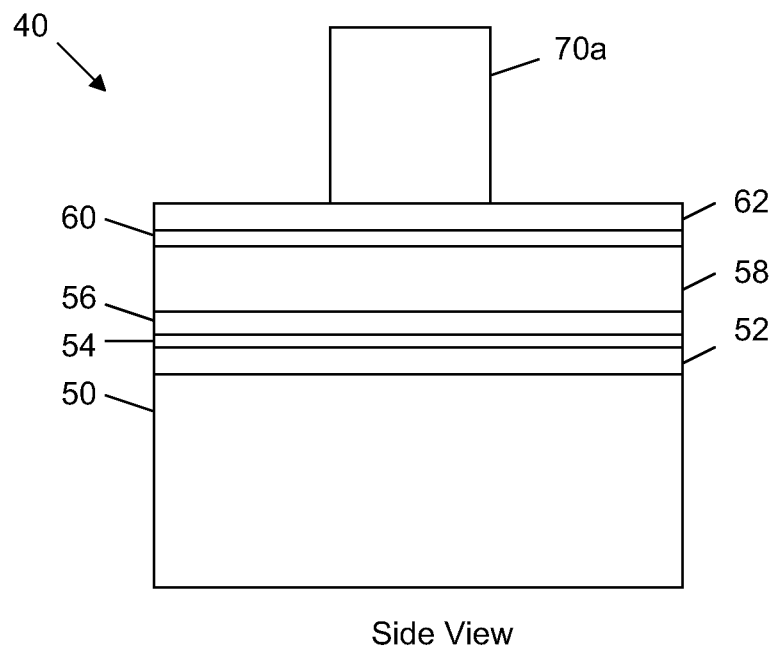
FIGS. 5A-5F illustrate a photolithography process for fabricating an EAMR apparatus having a bi-layer spacer according to an embodiment of the present invention.
Figure 5A:
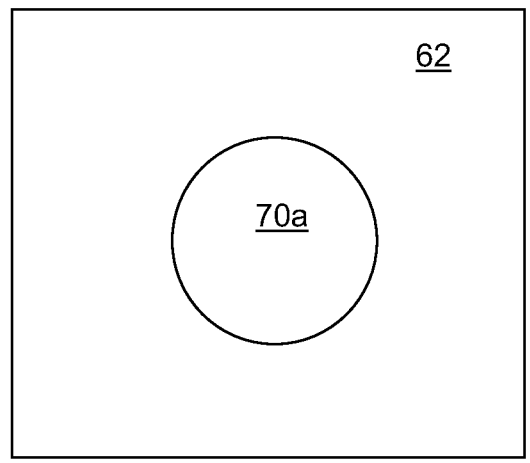

FIG. 5A illustrates a side cross-sectional view and a top plan view of a multi-layered stack 40 for fabricating the EAMR apparatus 10. The stack 40 includes a waveguide core layer 50 (e.g., $Ta_2O_5$) at a base of the stack 40, a first spacer layer 52 (e.g., $SiO_2$) on the waveguide core layer 50, an oxide layer 54 ($Ta_2O_5$) on the first spacer layer 52, an NFT material layer 56 (e.g., Au or an alloy of Au) on the oxide layer 54, an amorphous carbon hard mask (A-C hard mask) 58 on the NFT material layer 56, a tantalum (Ta) layer 60 on the A-C hard mask 58, and a chromium (Cr) layer 62 on the Ta layer 60. A first photoresist pattern 70a is formed on the Cr layer 62 for photo patterning the stack 40. In the top plan view, the first photo resist pattern 70a has a circular shape corresponding the disc shaped body of the NFT 14 of the EAMR apparatus 10 to be formed in subsequent processes.

Figure 5B:
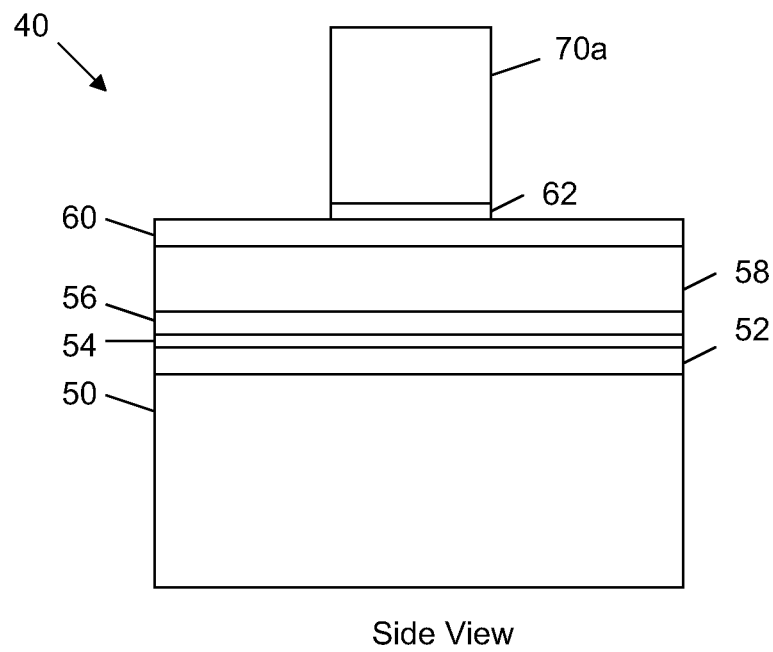
Figure 5B:
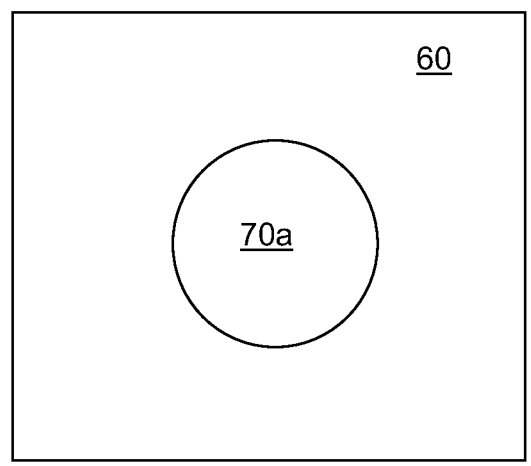

FIG. 5B illustrates a side cross-sectional view and a top plan view of the work piece (i.e., the stack 40) after patterning the Cr layer 62 using the first photoresist pattern 70a. In FIG. 5B, portions of the Cr layer 62 not covered by the first photoresist pattern 70a have been removed by a suitable material removal process (e.g., etching). Accordingly, the remaining portion of the Cr layer 62 has a shape corresponding to the shape of the first photoresist pattern 70a. That is, the shape of the first photoresist pattern 70a has effectively been transferred to the Cr layer 62. In this embodiment, the patterned Cr layer 62 has a circular shape. In other embodiments, the patterned Cr layer 62 can have other suitable shapes.

Figure 5C:
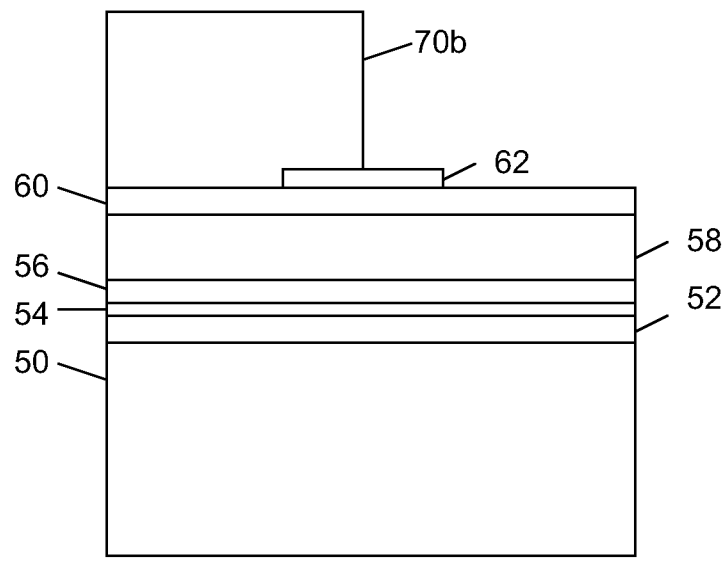
Figure 5C:
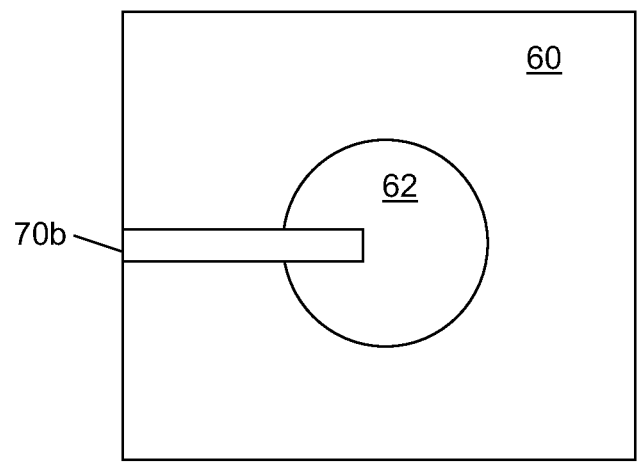

FIG. 5C is illustrates a side cross-sectional view and a top plan view of a second photoresist pattern 70b for forming the pin of the NFT 14. In FIG. 5C, the second photoresist pattern 70b has a rectangular shape (top view) and covers a portion of the disc shaped Cr layer 62 and a portion of the Ta layer 60.

Figure 5D:
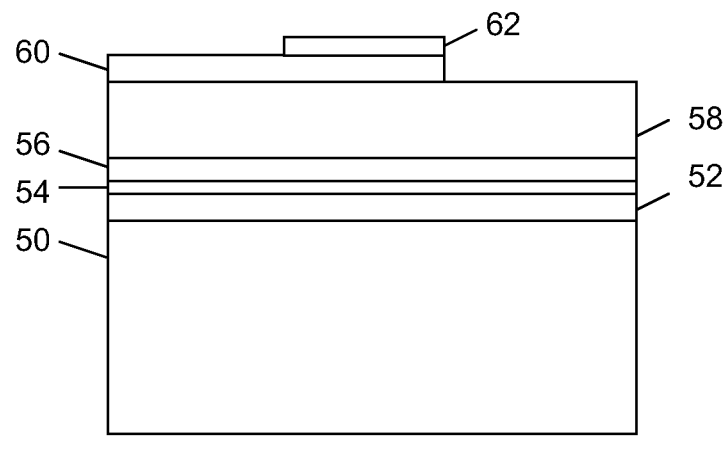
Figure 5D:
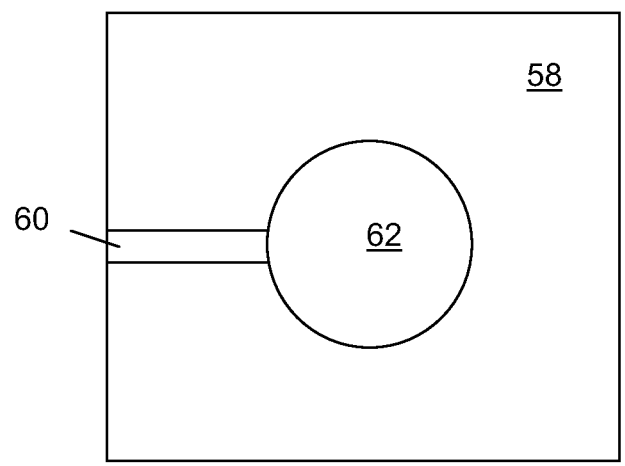

FIG. 5D illustrates a side cross-sectional view and a top plan view of the work piece after patterning the Ta layer 60 using the second photoresist pattern 70b and the Cr layer 62 as a mask. In FIG. 5D, after patterning the Ta layer 62 with a suitable material removal process (e.g., etching), portions of the Ta layer 60 not covered by the second photoresist pattern 70b or the Cr layer 62 have been removed. The remaining portion of the Ta layer 60 has a pin shape corresponding to the shape of the second photoresist pattern 70b and the disc shaped body that is covered by the Cr layer 62. Accordingly, portions of the A-C hard mask 58 that are not covered by the patterned Ta layer 60 or the Cr layer 62 are now exposed.

Figure 5E:
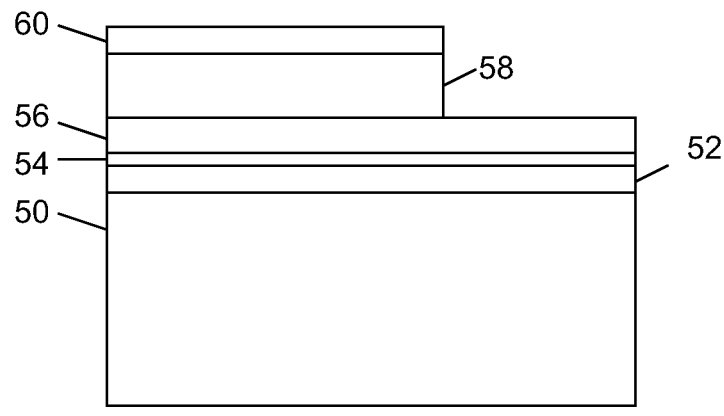
Figure 5E:
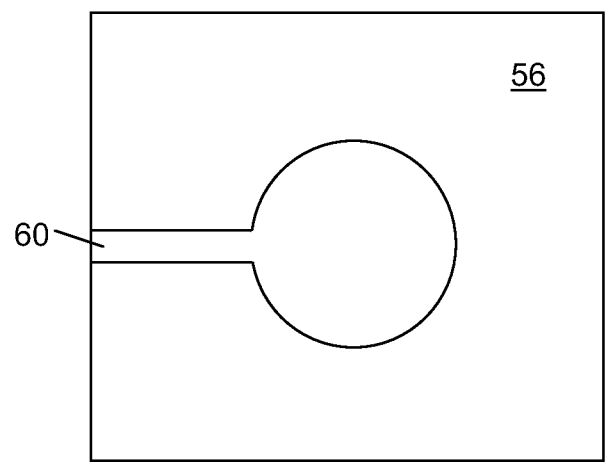

FIG. 5E illustrates a side cross-sectional view and a top plan view of the work piece after patterning the A-C hard mask 58. In FIG. 5E, the Cr layer 62 has been removed, and the exposed portions of the A-C hard mask 58 have been removed by a suitable material removal process (e.g., etching). Therefore, the patterned A-C hard mask 58 has a shape corresponding to the NFT 14. In this embodiment, the A-C hard mask 58 has a disc shaped body and a pin extending from the disc shaped body. Accordingly, portions of the NFT material layer 56 not covered by the patterned A-C hard mask 58 and Ta layer 60 are now exposed.

Figure 5F:
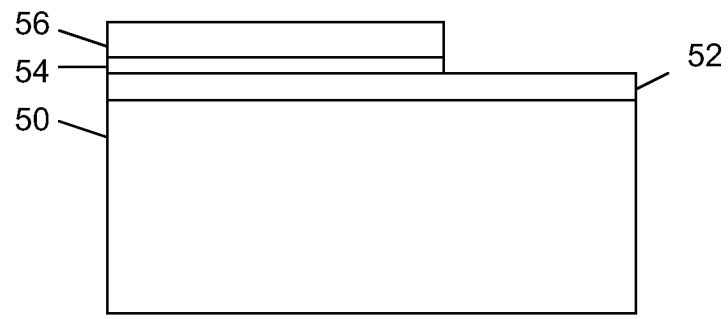
Figure 5F:
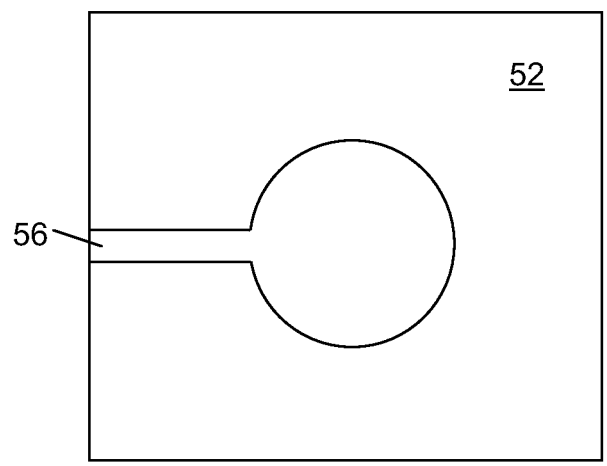

FIG. 5F illustrates a side cross-sectional view and a top plan view of the work piece after patterning the NFT material layer 56 and the oxide layer 54 using the patterned A-C hard mask 58 and Ta layer 60 as a mask. In FIG. 5F, after patterning the NFT material layer 56 and the oxide layer 54, the pin and disc body pattern (e.g., with top and bottom surfaces that are flat or substantially flat as shown in FIG. 5F) of the A-C hard mask 58 and Ta layer 60 have been transferred to the NFT material layer 56 and the oxide layer 54. Therefore, the remaining portion of the NFT material layer 56 has the desired shape of the NFT 14 from FIGS. 1 and 2, and the cap layer 22a has about the same shape as that of the NFT 14 and is formed under the NFT.

According to the above described exemplary embodiments of the present invention, a bi-layer spacer is formed between the NFT and a waveguide core to address the adhesion problem between the NFT and a spacer made of $SiO_2$.

While the above description contains many exemplary embodiments of the present invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. An energy assisted magnetic recording (EAMR) apparatus comprising:
    an optical waveguide core configured to direct light to a first end thereof;
    a near-field transducer (NFT) positioned adjacent to the first end of the optical waveguide core; and
    a bi-layer spacer positioned between the NFT and the optical waveguide core, the bi-layer spacer comprising a first spacer layer and an oxide cap layer consisting of a metal oxide or a combination of metal oxides, wherein the metal oxide or the combinations of metal oxides is completely oxidized.

2. The EAMR apparatus of claim 1, wherein the first spacer layer comprises SiO2.

3. The EAMR apparatus of claim 1, wherein the NFT comprises a material selected from the group consisting of gold (Au) and a Au alloy.

4. The EAMR apparatus of claim 1, wherein the oxide cap layer of the bi-layer spacer comprises a material selected from the group consisting of Ta2O5, TiO2, and combinations thereof.

5. The EAMR apparatus of claim 1, wherein the oxide cap layer of the bi-layer spacer is positioned closer to the NFT than to the optical waveguide core.

6. The EAMR apparatus of claim 1, wherein the oxide cap layer of the bi-layer spacer is in contact with the NFT, and the first spacer layer of the bi-layer spacer is in contact with the optical waveguide core.

7. The EAMR apparatus of claim 1, wherein the oxide cap layer of the bi-layer spacer is in contact with a side of the NFT, and the oxide cap layer has a shape substantially the same as that of the side of the NFT.

8. The EAMR apparatus of claim 1, further comprising a writer pole on the NFT and a heat dissipator between the writer pole and the NFT.

9. The EAMR apparatus of claim 1, further comprising a first cladding layer on at least a portion of the bi-layer spacer.

10. The EAMR apparatus of claim 9, further comprising a second cladding layer, wherein the optical waveguide core is between the second cladding layer and the bi-layer spacer.

11. The EAMR apparatus of claim 1, wherein the oxide cap layer of the bi-layer spacer has a thickness between about 1 nm and about 5 nm, inclusive.

12. The EAMR apparatus of claim 11, wherein the oxide cap layer of the bi-layer spacer has a thickness of about 2 nm.

13. The EAMR apparatus of claim 1, wherein the NFT has a thickness between about 30 nm and about 80 nm, inclusive.

14. The EAMR apparatus of claim 1, wherein the first spacer layer of the bi-layer spacer has a thickness between about 8 nm and about 12 nm, inclusive.

15. The EAMR apparatus of claim 14, wherein the first spacer layer of the bi-layer spacer has a thickness of about 10 nm.

16. A method of manufacturing an EAMR apparatus, the method comprising:
    forming a first cladding layer;
    forming an optical waveguide layer on the first cladding layer;
    forming a first spacer layer on the optical waveguide layer;
    forming an oxide cap layer consisting of a metal oxide or a combination of metal oxides on the first spacer layer, the oxide cap layer and the first spacer layer forming a bi-layer spacer layer; and
    forming a near-field transducer layer on the oxide cap layer,
    wherein the metal oxide or the combinations of metal oxides is completely oxidized.

17. The method of claim 16, wherein the first spacer layer comprises SiO2.

18. The method of claim 16, wherein the forming the near-field transducer layer comprises patterning the near-field transducer layer to form a near-field transducer (NFT) positioned adjacent to an end of the optical waveguide layer.

19. The method of claim 18, wherein the forming the oxide cap layer comprises patterning the oxide cap layer such that the oxide cap layer has a shape substantially the same as the NFT.

20. The method of claim 19, further comprising:
    forming a second cladding layer on both the bi-layer spacer layer and the NFT; and shaping a portion of the second cladding layer to form a sloped portion on the NFT.

21. The method of claim 20, further comprising forming a writer pole on both the second cladding layer and the NFT.

22. The method of claim 16, wherein the near-field transducer layer comprises a material selected from the group consisting of gold (Au) and a Au alloy.

23. The method of claim 16, wherein the optical waveguide layer comprises a core comprising Ta2O5.

24. The method of claim 16, wherein the oxide cap layer comprises a material selected from the group consisting of Ta2O5, TiO2, and combinations thereof.

25. The method of claim 16, further comprising:
   forming a hard mask layer on the near-field transducer layer;
   patterning the hard mask layer to expose a portion of the near-field transducer layer;
   removing the exposed portion of the near-field transducer layer to form a near field transducer (NFT); and
   removing an exposed portion of the oxide cap layer of the bi-layer spacer layer such that the remaining portion of the oxide cap layer is between the NFT and the first spacer layer of the bi-layer spacer layer.

26. The method of claim 25, wherein the NFT has a pin portion having a first end and a second end adjacent to an end of the optical waveguide layer, and a disc portion attached to the first end of the pin portion.

27. The method of claim 25, wherein the oxide cap layer of the bi-layer spacer layer has a thickness between about 1 nm and about 5 nm, inclusive.

28. The method of claim 27, wherein the oxide cap layer of the bi-layer spacer layer has a thickness of about 2 nm.

29. The method of claim 25, wherein the NFT has a thickness between about 30 nm and about 80 nm, inclusive.

30. The method of claim 25, wherein the first spacer layer of the bi-layer spacer layer has a thickness of about 10 nm.

31. The EAMR apparatus of claim 1:
   wherein the NFT comprises a preselected shape that is substantially flat; and
   wherein the bi-layer spacer comprises a preselected shape that is substantially flat.

32. The EAMR apparatus of claim 31:
   wherein the preselected shape of the NFT comprises a disc portion; and
   wherein the preselected shape of the bi-layer spacer comprises a disc portion.

33. The method of claim 18:
   wherein the NFT comprises a preselected shape that is substantially flat; and
   wherein the bi-layer spacer comprises a preselected shape that is substantially flat.

34. The method of claim 33:
   wherein the preselected shape of the NFT comprises a disc portion; and
   wherein the preselected shape of the bi-layer spacer comprises a disc portion.

35. An energy assisted magnetic recording (EAMR) apparatus comprising:
   an optical waveguide core configured to direct light to a first end thereof;
   a near-field transducer (NFT) positioned adjacent to the first end of the optical waveguide core; and
   a bi-layer spacer positioned between the NFT and the optical waveguide core, the bi-layer spacer comprising a first spacer layer and an oxide cap layer consisting of a metal oxide or a combination of metal oxides, wherein the metal oxide or the combinations of metal oxides is completely oxidized;
   wherein the first spacer layer comprises SiO2;
   wherein the NFT comprises a material selected from the group consisting of gold (Au) and a Au alloy;
   wherein the preselected shape of the NFT comprises a disc portion; and
   wherein the preselected shape of the bi-layer spacer comprises a disc portion.

* * * * *